United States Patent
Rooney

(10) Patent No.: US 6,819,669 B2
(45) Date of Patent: Nov. 16, 2004

(54) METHOD AND SYSTEM FOR DATA COMMUNICATION

(75) Inventor: Sean G. Rooney, Zurich (CH)

(73) Assignee: International Business Machines Corporation, Armonk, NY (US)

(*) Notice: Subject to any disclaimer, the term of this patent is extended or adjusted under 35 U.S.C. 154(b) by 820 days.

(21) Appl. No.: 09/819,216

(22) Filed: Mar. 28, 2001

(65) Prior Publication Data

US 2002/0012322 A1 Jan. 31, 2002

(30) Foreign Application Priority Data

Jul. 26, 2000 (EP) .............................. 00116008

(51) Int. Cl.$^7$ .............................................. H04L 12/28
(52) U.S. Cl. ...................... 370/390; 370/392; 370/432
(58) Field of Search ................................ 370/390, 392, 370/516, 432, 470, 401, 519, 282, 471, 312, 316, 349, 515, 389, 395.21, 395.4, 395.52

(56) References Cited

U.S. PATENT DOCUMENTS

| | | | | |
|---|---|---|---|---|
| 4,818,984 A | * | 4/1989 | Chang et al. ............ | 340/10.31 |
| 5,936,661 A | | 8/1999 | Trew | |
| 6,584,110 B1 | * | 6/2003 | Mizuta et al. ............ | 370/401 |

* cited by examiner

Primary Examiner—Chi Pham
Assistant Examiner—Alexander O. Boakye
(74) Attorney, Agent, or Firm—Derek S. Jennings; Anne V. Dougherty

(57) ABSTRACT

A method, a system and a device for data communication between a sender and a plurality of recipients are provided to be used for interactive multimedia systems such as interactive television game shows. First, the sender transmits over a data network a first message. The first message causes a response message returned by one of the plurality of recipients to be delayed for a random period of time. Then, the sender broadcasts a second message asking the plurality of recipients for a response message. After having received the second message, each recipient initiates a response message. The response message is delayed for a random delay time. Thereafter, the response message is transmitted to the sender over the data network. Finally, the sender waits for a second period of time for response messages to arrive at the return address. A major advantage of the invention is a reduction of a peak load caused by the recipients' response messages.

28 Claims, 1 Drawing Sheet

METHOD AND SYSTEM FOR DATA COMMUNICATION

BACKGROUND OF THE INVENTION

1. Field of the Invention

The present invention relates to a method, a system and a device for data communication between a sender and a plurality of recipients at least partly taking place over a data network such as a computer network. The provided method, system and device can particularly used for interactive multimedia systems such as interactive television game shows.

2. Description of the Related Art

Interactive multimedia system refers to any computer-delivered electronic system that allows the user to control, combine, and manipulate different types of media, such as text, sound, video, computer graphics, and animation. Interactive multimedia integrate a computer, a memory storage, digital (binary) data, a telephone, a television, and other information technologies. Their most common applications include training programs, video games, electronic encyclopedias, and travel guides. Interactive multimedia shift the user's role from observer to participant and are considered the next generation of electronic information systems.

The most common multimedia machine consists of a personal computer. Many systems also integrate a handheld tool, e.g., a control pad or joystick, that is used to communicate with the computer. Such systems permit users to interact with the system.

Among the interactive multimedia systems under commercial development by the mid-1990s were cable television services with computer interfaces that enable viewers to interact with television programs. Such television programs are advantageously broadcast by high-speed interactive audiovisual communications systems that rely on digital data from fiber optic lines or digitized wireless transmissions.

From U.S. Pat. No. 5,936,661 an interactive television game system is known. More particularly, a method is known how to enable viewers to take part in a television quiz show with studio participants using an interactive television system. The taught method comprising the steps of transmitting, live, a quiz show in which questions are asked of studio participants, transmitting answers to the questions at an appropriate time in the program, transmitting a signal which determines a time during which viewers are allowed to answer the questions, allocating scores to correctly answered questions, at a given time during the quiz show, inviting viewers who have accumulated a qualifying score to take part, live, in the quiz show with the studio participants, providing each of the invited viewers with a communication link to the studio to enable live participation, receiving answers in real time from the invited viewers for the remainder of the quiz show and accumulating the scores of both the invited viewers and the studio participants to determine the winner.

Furthermore, a television receiver is provided for use in an interactive television system, the television receiver comprising means for receiving a television signal representing a quiz show, means for receiving, via an auxiliary data channel, answers to each question posed in the quiz show, means for enabling a viewer to answer each question posed, means for comparing the viewer's answer with a correct answer and allocating a score for that answer on the basis of the result of the comparison, means for accumulating the scores for each of the questions, means for receiving a signal inviting viewers whose accumulated scores at least reach a given value, to participate live in the remainder of the quiz show, and means for requesting participation in the rest of the show if the accumulated score reaches the given value.

However, the majority of the methods and systems providing interactive television or interactive radio broadcasting have in common that at a particular instant of time the viewers are invited to respond to the show, i.e., to answer a question, to make a selection or to vote for something or somebody. Having a large number of viewers, the communication system used for data communication has to cope with a large number of responses being returned in a very short period of time, i.e., practically at the same instant of time.

OBJECT OF THE INVENTION

It is therefore an object of the present invention to provide a method, a system and a device that can cope with such a peak load.

BRIEF SUMMARY OF THE INVENTION

The foregoing object is achieved by a method, a system and a device for data communication between a sender and a plurality of recipients at least partly taking place over a data network according to the present invention. Advantageously, it can be used for interactive multimedia systems such as interactive television game shows. Furthermore, the method, system and device in accordance with the present invention can be employed for electronically collecting market survey data.

More particularly, the same method and system are described respectively. Since more than one party is involved in the communication and the exchange of data in accordance with the present invention, the invention is claimed described from the perspective of each of the different participants.

First, the sender transmits over the data network a first message that contains a return address and information about the length of a first period of time. Furthermore, the first message causes a response message being sent to the return address by one of the plurality of recipients to be delayed for a random period of time, the length of which being derived from the length of the first period of time. In return, each recipient receives the first message over the data network.

Then, the sender broadcasts a second message asking the plurality of recipients for a response message. After having received the second message, each recipient taking part in the interactive communication with the sender responds to the second message by initiating a response message to be sent. The response message is delayed for a random delay time. The length of the random delay time is derived from the length of the provided first period of time, e.g., it is at most as long as the length of the first period of time. After that, the response message is transmitted to the return address over the data network.

However, without departing from the spirit of the invention, the first and the second message can alternatively be transmitted practically at the same time or the content of the first and the second message can be transmitted using one single message.

Finally, the sender waits for at least a second period of time measured from the time of sending the second message for the response messages to arrive at the return address. The length of the second period of time is at least as long as the length of the first period of time.

A major advantage of the method, system and device according to the present invention is a reduction of a peak load caused by the plurality of response messages to the network and server, since the response messages are not sent immediately after they have been initiated, but each after waiting a random delay time. Hence, the plurality of response messages are basically equally spread over a period of time having the length of the first period of time specified by the sender. Therefore, the peak load is considerably reduced.

However, in an advantageous embodiment the length of the first period of time is determined by dividing an estimated number of expected response messages by a number of response messages that the network and the server can handle in a given period of time. This will lower the peak load to an amount the network and server are able to cope with at the same time causing a minimum time delay only.

Another advantage of the present invention is the fact that television stations presenting interactive game shows do not need to provide or rent an infrastructure having a high bandwidth, because the method, system and device according to the present invention reduce the maximum load that a server is required to support, thus allowing current generation servers to handle games for numbers of clients that would not be possible otherwise.

BRIEF DESCRIPTION OF THE DRAWING

The above, as well as additional objectives, features and advantages of the present invention, will be apparent in the following detailed written description.

The novel features of the invention are set forth in the appended claims. The invention itself, however, as well as the best mode, further objectives, and advantages thereof, will best be understood by reference to the following detailed description of an illustrative embodiment when read in conjunction with the accompanying drawing, wherein:

DETAILED DESCRIPTION OF THE INVENTION

Figure 1:
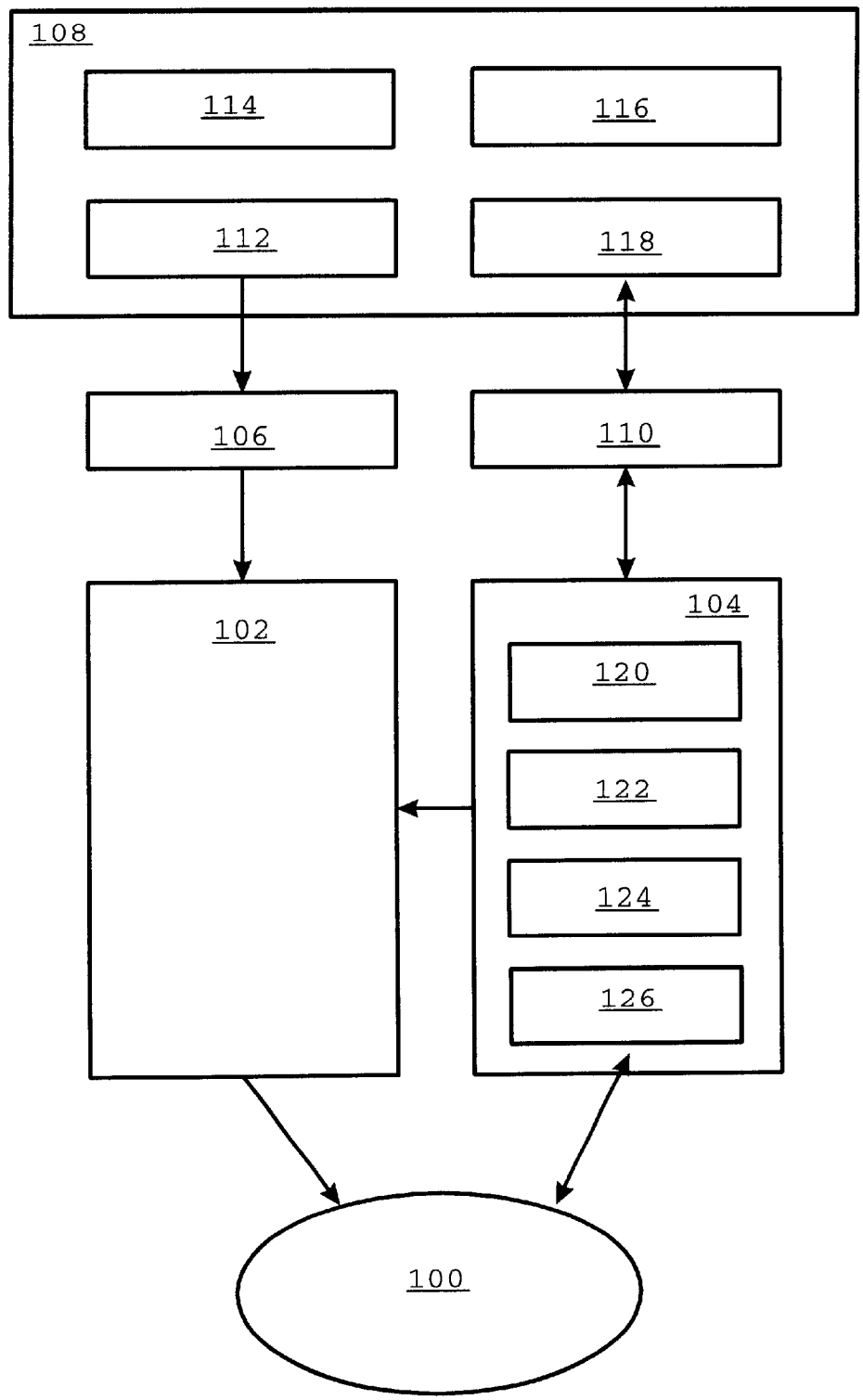
FIG. 1 shows a high level block diagram of a system and device according to the present invention within a possible environment.

With reference to FIG. 1, there is depicted a high level block diagram of a system and device according to the present invention. A user 100 is watching television, i.e., information is being transmitted from a television set 102 to the user 100. It is assumed that the user 100 takes part in an interactive television production, e.g., an interactive television game show. It is to be understood that the functionality the television set provides in the environment shown in FIG. 1 can also be provided by a radio the user 100 is listening to or information being received from an Internet page or through a telephone line.

On the other hand, the user 100 is able to access a set-top box 104. This is generally an electronic device designed to produce output on a conventional television set, on top of which it nominally sits. Furthermore, it is connected to some other communications channels such as telephone, optical fiber or cable television service. The set-top box 104 is provided for allowing the user to interact with the programs shown on the television set 102. However, all the functionality offered by the set-top box 104 described in the following in greater detail can as well be implemented within a personal computer.

The television set 102 receives streaming video and audio to present to the user 100 over a transmission facility 106. The transmission facility 106 can either be formed by terrestrial radio broadcast, satellite, cable television service or the Internet.

An organization presenting an interactive game show sets up a system 108 for data communication between a sender and a plurality of recipients. Through the system 108 the organization feeds the streaming video and audio into the transmission facility 106. Furthermore, it also communicates bi-directionally with the user 100 through the set-top box 104 and a data network 110. The data network 110 can be formed either by a computer network, such as the Internet, cable television service or a telephone line.

The system 108 includes a transmitting installation 112, an input/output unit 114, a timer 116 and a server 118 functioning as a receiver and transmitter for sending and receiving messages from the sender and the recipients respectively. In a preferred embodiment the server can be formed by a HTTP server, whereby HTTP stands for "Hypertext Transfer Protocol" the client-server TCP/IP (Transmission Control Protocol over Internet Protocol) protocol used on the World-Wide Web for the exchange of HTML (Hypertext Markup Language) documents.

The transmitting installation 112 converts the streaming video and audio, e.g., the game show, into a format suitable to be sent over the transmission facility 106, depending on whether the transmission facility 106 is formed by terrestrial radio broadcast, satellite, cable television service or the Internet.

The input/output unit 114 is used to control the system 108. It will be understood, that in an implementation of the system 108 the input/output unit 114 can comprise multiple interfaces for a person machine communication, e.g., there can be panels for controlling the transmission installation as well as a keyboard for controlling the server 118. Thus, purely for the sake of clarity there is only one input/output unit 114 depicted in FIG. 1. The same applies to the remaining functional units, which can be implemented differently as long as they are providing the same functionality.

The timer 116 measures the period of time that has to be waited for the response messages to arrive at the server 118. However, the timer and the server can be realized using the same computer. The server 118 provides the needed environment for sending and receiving messages. The plurality of recipients or, as depicted in FIG. 1, the user 100 requests a web page from the server by instructing the set-top box respectively. A web page basically is a block of data available through a computer network, such as the Internet, identified by a specific address, such as the URL (Uniform Resource Locator). In the simplest, most common case, a web page is a file written in a language called HTML (Hypertext Markup Language), stored on a server.

The set-top box 104 comprises a network connector 120, a sender/receiver 122, a processing unit 124 and a user interface 126. The network connector 120 connects the set-top box to the data network in a way to enable communication between the set-top box 104 and the data network 110. The network connector can, for example, be formed by a modem (Modulator/demodulator). This is an electronic device for converting between serial data from a computer, here the set-top box 104, and an audio signal suitable for transmission over telephone lines or cable.

On one hand, the sender/receiver 122 converts the data to be transmitted into a format suitable to be sent over the data network 110, depending on whether the data network 110 is formed by a computer network, such as the Internet, cable television service or a telephone line. On the other hand, the sender/receiver 122 converts the incoming data from the data network 110 into a format to be computed by the processing unit 124.

The processing unit 124 includes a timer for measuring a delay a response message getting delayed after the response message has been initiated by the user 100. Further, the processing unit 124 comprises an arithmetic unit for calculating a pseudo random function for determining the length of a random delay time.

Via the user interface 126 the user 100 is able to interact with the set-top box 104 and therefore with the server 118 and the system 110 for data communication respectively. The user interface 126 generally refers to the aspects of the set-top box 104 or a program controlling the set-top 104 box that can be seen or heard or otherwise perceived by the user 100, and commands and mechanisms the user 100 uses to control its operation and input data. The user interface 126 can, for example, be formed by a graphical user interface. This provides pictures or symbols instead of plain text for output of information and a pointing device such as a mouse or a touch screen for input and control the set-top box. However, for data output the set-top box can use the television set as a display unit or monitor.

Now assume an interactive game show is taking place. The viewers are invited to take part in the game show. Therefore, the user 100 selects a respective web page provided by the server 118 by instructing the set-top box 104 respectively. Using the set-top box the user 100 and a plurality of other users (not shown) also taking part in the game show are able to respond to questions given by a presenter of the game show. Hence, the user 100 is now a contestant playing with other users sitting at home and possibly contestants being present in a television studio in which the game show is produced.

In the game show, multiple choice questions could be given, e.g., "is it A, B or C?" Advantageously, a voice recognition system is integrated into the set-top box allowing open questions, such as "What is the capital of France?" The user 100 answers the question by either typing, pointing on a screen, selecting with a mouse pointer or just saying the answer loudly. According to the present invention the answer is not directly returned to the server, but it is delayed for a random period of time. The length of the random period of time is computed by the set-top box. However, the maximal length of the random period of time has previously been specified by the organization presenting the game show. The length of the first period of time is determined by dividing an estimated number of expected response messages by a number of response messages that the network and the server can handle in a given period of time.

For example, it is assumed that there are 10 million people playing the game. The data network 110 and the server 118 would have to deal with 10 million replies. Further, the infrastructure can only deal with 1 million replies per second. If each reply is delayed an arbitrary time within a period of 10 seconds, then the load can be handled. In fact, the user's endpoints are being used to buffer the 9 million messages that the infrastructure knows are coming but cannot handle. The method, system and device according to the present invention scales with the number of users, so, for example, if 20 million people were to play on the same infrastructure then only the time period in which the random delay is chosen would have to be increased.

While the initial application for the present invention is interactive game shows having a response channel organized over the data network 110, such as the Internet, the invention is applicable whenever the behavior of a large number of clients is similar, predictable and where having to wait some additional number of seconds is not a major disadvantage. Special offers, for example, selling an object at a premium price for anyone who buys within the next 15 minutes, would be another application.

Another advantage of the present invention lies in the ease of its implementation. In another embodiment, it simply requires a piece of software running on a personal computer at a user's 100 endpoint. The software delays the emission of a message for a random period of time and the message sent by the user 100 must pass through the piece of software to be valid. In the context of a web browser, this could be achieved with a Java applet, whereby Java is a programming language and a Java applet is a Java program that can be distributed as an attachment in a web document and executed by a Java-enabled web browser. For example, the applet is downloaded for every new question in a game context and encrypts the response message to ensure that the message was processed by the applet.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product which may be stored on a computer readable medium (such as a magnetic or optical storage medium or other storage medium), which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

I claim:

1. A method for data communication between a sender and a plurality of recipients at least partly taking place over a data network, said method comprising:

transmitting over said data network a first message, whereby said first message contains a return address and information about the length of a first period of time and whereby said first message further causes a response message being sent to said return address by one of said plurality of recipients to be delayed for a random delay time the length of which being derived from the length of said first period of time;

broadcasting a second message asking said plurality of recipients for a response message;

waiting for at least a second period of time for said response messages to arrive at said return address, whereby the length of said second period of time is at least as long as the length of said first period of time.

2. The method for data communication according to claim 1, wherein said data network is formed by a cable television service.

3. The method for data communication according to claim 1, wherein said data network is formed by a computer network.

4. The method for data communication according to claim 3, wherein said computer network is formed by the Internet.

5. The method for data communication according to claim 4, wherein said first message is formed by elements of a web page.

6. The method for data communication according to claim 5, wherein said second message is broadcast via a television or radio channel.

7. The method for data communication according to claim 6, wherein said second message is broadcast to said plurality of recipients (100) substantially at the same instant of time.

8. The method for data communication according to claim 7, wherein the length of said first period of time is determined by dividing an estimated number of expected response messages by a number of response messages that can be handled in a given period of time.

9. The method for data communication according to claim 8, wherein the length of said random delay time is returned to said return address as part of the response messages.

10. A method for data communication between a sender and a recipient at least partly taking place over a data network, said method comprising:

receiving over said data network a first message containing information about the length of a first period of time and a return address;

receiving a second message asking for a response message;

responding to the second message by initiating a response message to be sent;

delaying said response message for a random delay time derived from the length of said broadcast first period of time;

transmitting said response message to said return address over said data network.

11. The method for data communication according to claim 10, wherein said data network is formed by a cable television service.

12. The method for data communication according to claim 10, wherein said data network is formed by a computer network.

13. The method for data communication according to claim 12, wherein said computer network is formed by the Internet.

14. The method for data communication according to claim 13, wherein said first message is formed by elements of a web page.

15. The method for data communication according to claim 14 herein said second message is received via a television or radio channel.

16. The method for data communication according to claim 15 wherein the length of said random delay time is calculated using a pseudo random function.

17. The method for data communication according to claim 16 herein the length of said random period can vary between zero and the provided length of said first period of time.

18. The method for data communication according to claim 17, herein the length of said random delay time is returned to said return address as part of the response message.

19. A computer program product stored on a computer usable medium, comprising computer readable program means for causing a computer to perform a method according to claim 1.

20. A system for data communication between a sender and a plurality of recipients at least partly taking place over a data network, said device comprising:

a transmitter for transmitting over said data network a first message, whereby said first message contains a return address and information about the length of a first period of time and whereby said first message further causes a response message being sent to said return address by one of said plurality of recipients to be delayed for a random delay time derived from the length of said first period of time, a transmitting facility for broadcasting a second message asking said plurality of recipients for a response message, receiver for receiving said response messages, and a timer for determining the length of a second period of time waiting for said response messages to arrive at said return address, whereby the length of said second period of time is at least as long as the length of said first period of time.

21. The system for data communication according to claim 20, wherein said data network is formed by a cable television service.

22. The system for data communication according to claim 20, wherein said data network is formed by a computer network.

23. The system for data communication according to claim 22, wherein said computer network is formed by the Internet.

24. The system for data communication according to claim 23, wherein said transmitter is formed by a server and said first message is formed by elements of a web page.

25. The system for data communication according to claim 24, wherein said second transmitting facility is formed by a television or radio channel.

26. The system for data communication according to claim 25, further comprising a calculation unit for calculating the length of said first period of time the length of which being determined by dividing an estimated number of expected response messages by a number of response messages that can be handled in a given period of time.

27. A device for data communication between a sender and a recipient at least partly taking place over a data network, said device comprising:

a connector connecting said device to said data network, a receiver for receiving over said data network a first message containing information about the length of a first period of time and a return address, a user interface for initiating a response message to be sent, a random number generator generating the length of a random delay time derived from the length of said broadcast first period of time, a timer for measuring a delay said response message getting delayed, a transmitter for transmitting said response message to said return address over said data network.

28. A computer program product stored on a computer usable medium, comprising computer readable program means for causing a computer to perform a method according to claim 10.

* * * * *